Aug. 21, 1923.

H. W. SPUNG

VEHICLE DIRECTION INDICATOR

Filed March 16, 1923

Witnesses:
F. L. Fox,
N. Berman

H. W. Spung,
Inventor

By Clarence O'Brien
Attorney

Aug. 21, 1923.
H. W. SPUNG
1,465,494
VEHICLE DIRECTION INDICATOR
Filed March 16, 1923   5 Sheets-Sheet 2
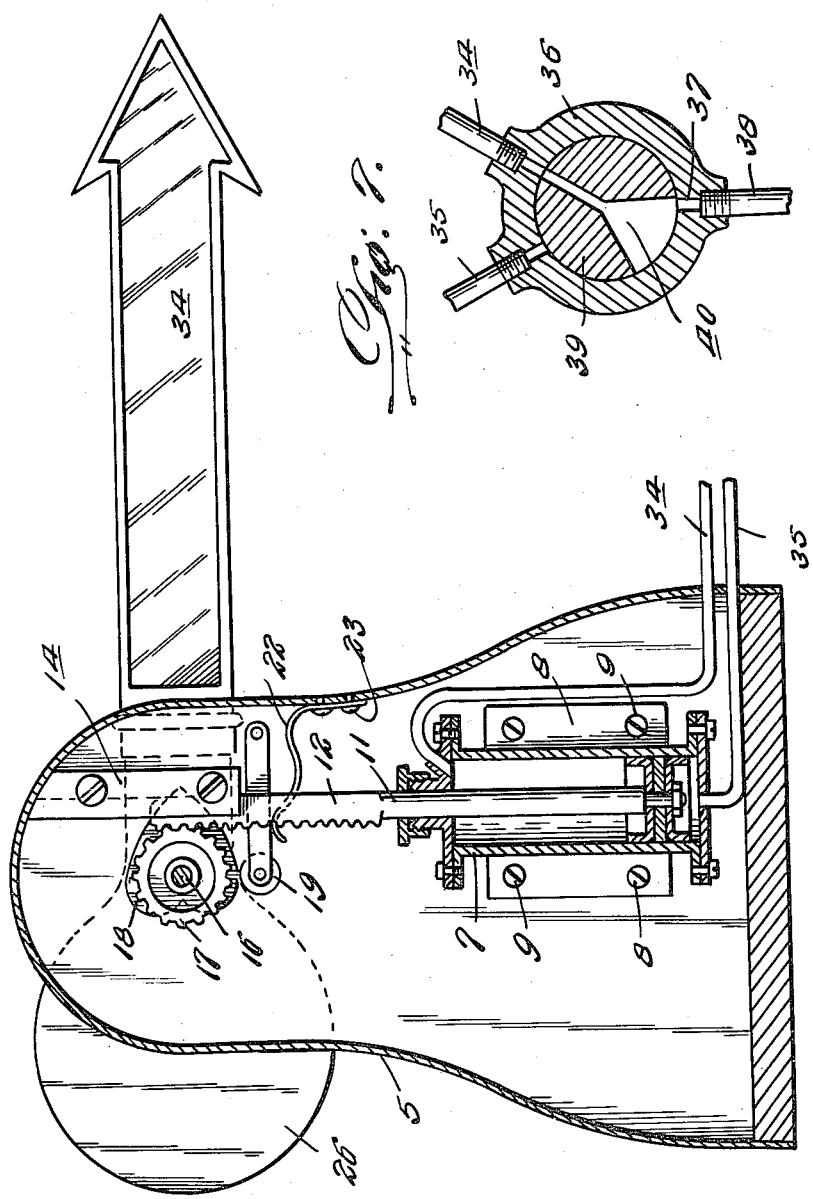

Aug. 21, 1923.
H. W. SPUNG
1,465,494
VEHICLE DIRECTION INDICATOR
Filed March 16, 1923    5 Sheets-Sheet 3
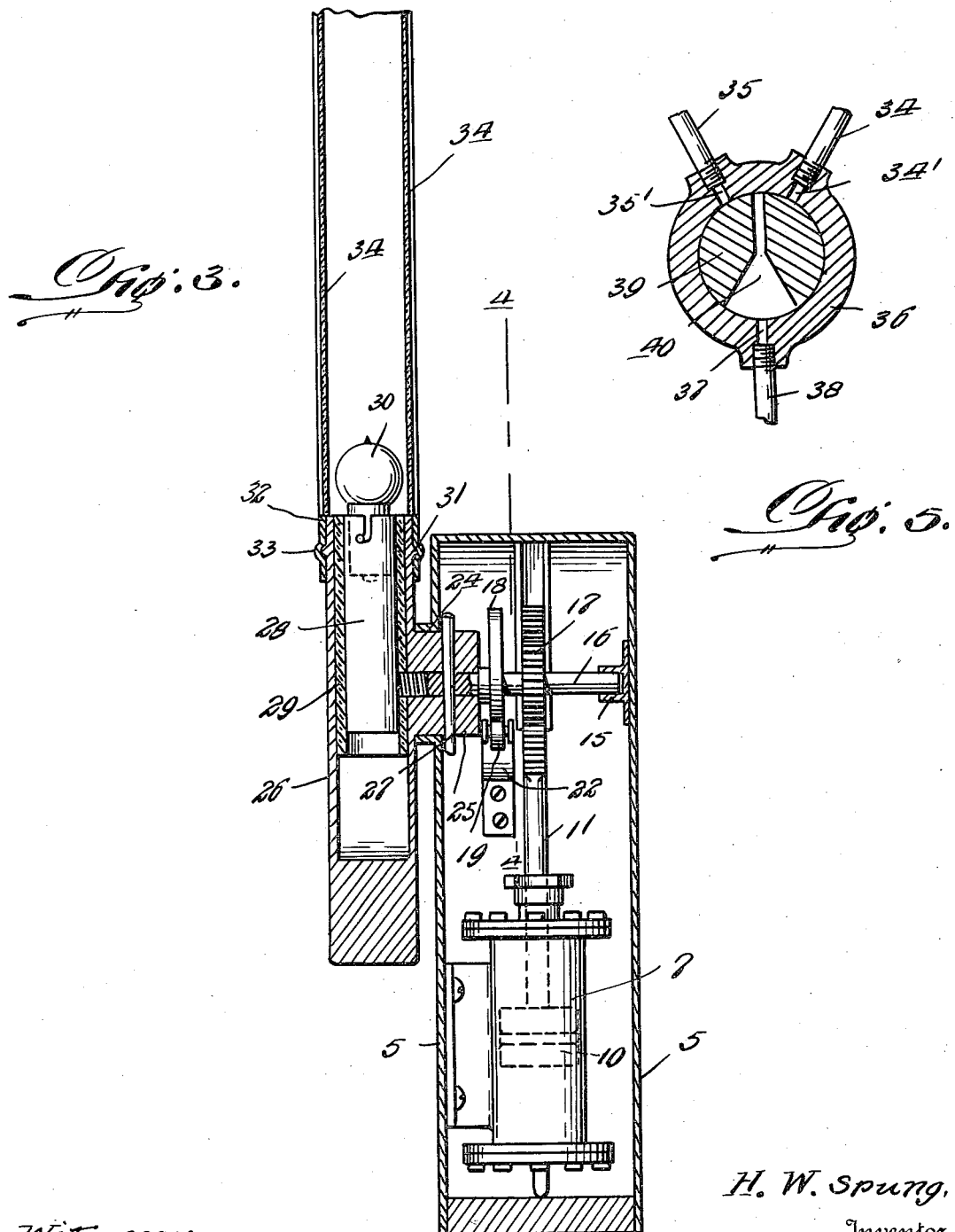

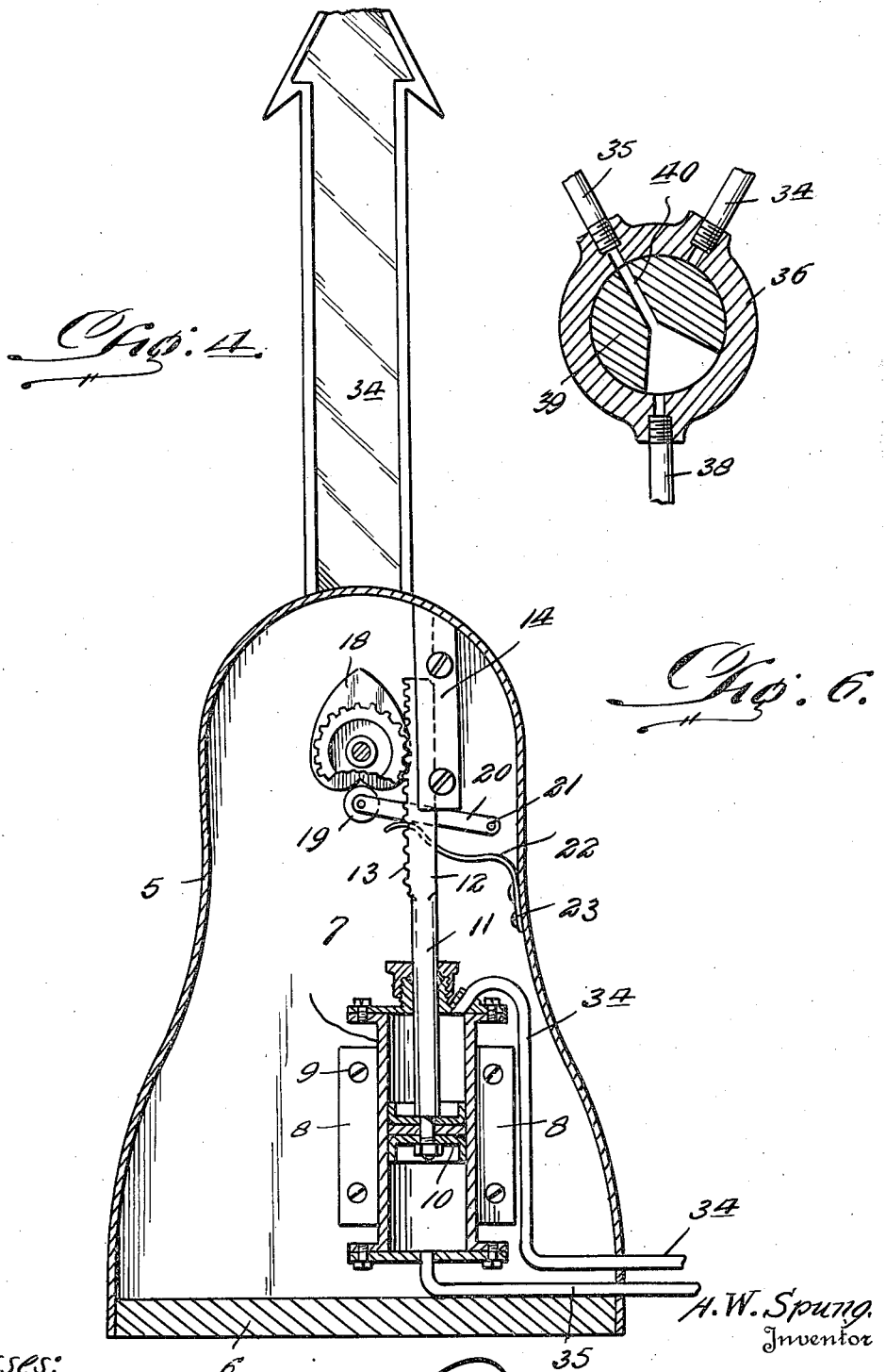

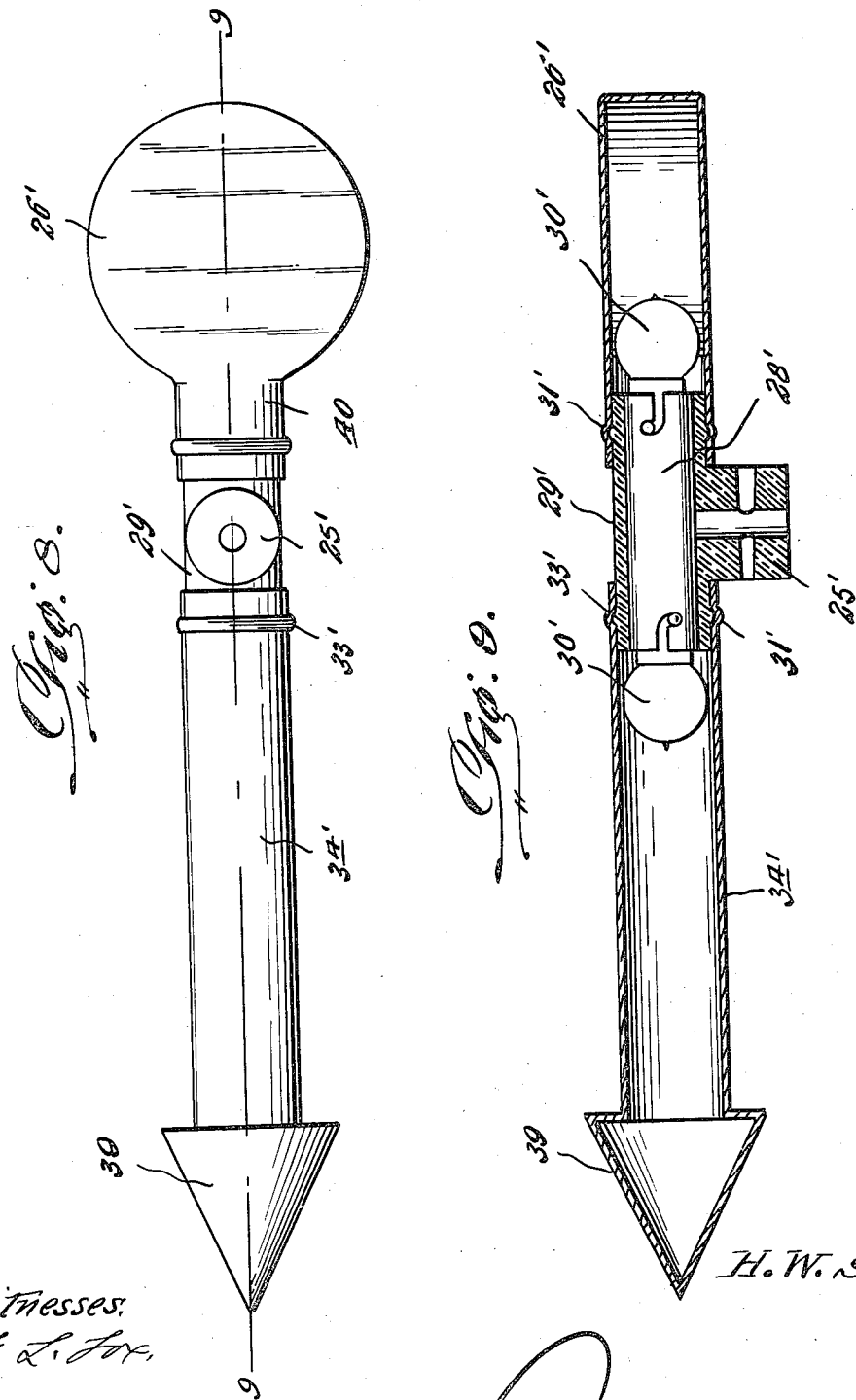

Patented Aug. 21, 1923.

1,465,494

UNITED STATES PATENT OFFICE.

HOWARD W. SPUNG, OF MARIETTA, OHIO.

VEHICLE DIRECTION INDICATOR.

Application filed March 16, 1923. Serial No. 625,528.

*To all whom it may concern:*

Be it known that HOWARD W. SPUNG, a citizen of the United States, residing at Marietta, in the county of Washington and State of Ohio, has invented certain new and useful Improvements in Vehicle Direction Indicators, of which the following is a specification.

My invention relates to an improvement in direction indicators for vehicle, the device being characterized by a signal arm movable in a direction either toward the right or left, this movement of the signal arm being controlled by the suction in the intake manifold of the vehicle motor in a novel and simple manner.

The primary object of my invention resides in the provision of such an indicator for vehicle that may be applied in an expeditious manner to practically all types of vehicles with which I am now familiar.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 2 is a vertical detail cross sectional view thereof;

Figure 3 is a vertical transverse cross sectional view, the indicating arm being disposed in an upright unindicating position;

Figure 4 is a view somewhat similar to Figure 2 showing the reverse side of the different elements constituting the invention, the indicating arm being in an upright unindicating position;

Figures 5, 6 and 7 are detail cross sections of a specific form of control valve, the core thereof being shown in three different positions;

Figure 8 is a side elevation of a slightly modified form of indicating arms; and Figure 9 is a detail cross section upon the line 9—9 of Figure 8.

Figure 1:
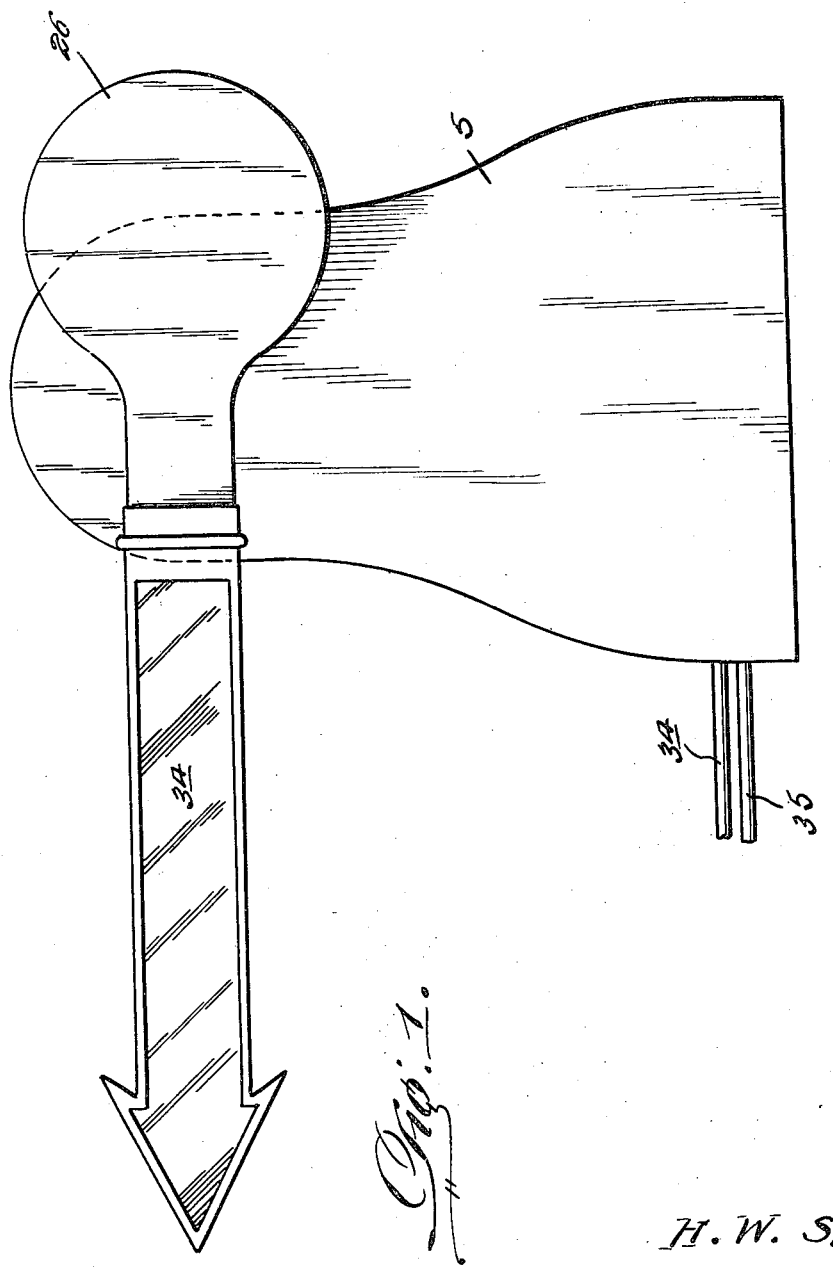
Figure 1 is a front elevational view of my improved signal, the indicating arm being extended to a position toward the left.

Referring to the drawings in detail, 5 designates a metallic casing which as clearly shown is of substantial bell-shape in elevation and has a bottom wall 6 of wood or other appropriate material. Within the casing 5, preferably adjacent the bottom wall thereof, is a cylinder 7, the same being formed with side brackets 8 which are secured as at 9 to the inner wall of the casing 5. Rectilinearly movable within the cylinder is a piston 10 carried by the lower end of a piston rod 11. This rod is slidable through a packed opening in the cylinder head and is squared at its upper end at 12, one side of this squared opening being racked at 13. In vertical alinement with the central portion of the said rod 11 and secured within the casing in any manner desirable is a piston rod guide 14 for the purpose of guiding the rod in a true up and down movement.

Journaled at one end within a bore 15 upon the front wall of the casing 5 and adjacent the upper end thereof is a shaft 16 which carries a spur gear 17 in mesh with the racked edge 13 of the squared portion 12 of said piston 10. Also upon the shaft 16 and to one side of the spur gear 17 is a heart-shaped cam 18 and in contact with the edge thereof is a roller 19 carried by one end of a link 20, the opposite end of this link being pivoted at 21 to the adjacent front wall of the casing 5. This roller 19 is maintained in positive engagement with the periphery of said heart-shaped cam 18 through the instrumentality of a band spring 22, one end thereof being curved and in engagement with the said link 20 while the other end is rigidly secured at 23 to one of the end walls of the casing.

Freely rotatable within an opening 24 formed within the front wall of the casing and of coextensive width with the shaft 16 is an annular projection 25 formed upon one side of a hollow weighted member 26. This annular projection 25 has a central longitudinal bore for receiving the adjacent end of the above mentioned shaft 16, the same being keyed to the shaft by a cross pin 27.

Within the upper end of the said weighted member 26 is a relatively elongated lamp bulb socket 28 insulated from the weighted member by a fibre sleeve 29. Within the upper end of said socket 28 is a desirable form of electric lamp 30. Adjacent the upper end of the said weighted member 26 the same is formed with a bead 31 and in detachable engagement with this end of the weighted member is the lower end of a substantial arrow-shaped casing 32, the same being formed with a channel 33 adjacent its lower end for engagement over the bead 31 of the member 26. The front and rear walls of the arrow-shaped casing 32 is open for the reception of strips of frosted celluloid 34.

In communication with the upper end of the cylinder 7 is the inlet of a suction pipe 34 while also in communication with the lower end of the cylinder 7 is an inlet of a suction pipe 35.

As more clearly shown in Figures 5, 6 and 7, each of these pipes are in communication with inlet passages 34' and 35' of a valve casing 36. Directly between the said inlet passages 34' and 35' and upon the opposite side of the casing 36 is a passage 37 in communication with which is one end of a suction pipe 38, this pipe leading to the intake manifold of the vehicle engine and attached therein. Within the casing 36 is the usual rotary core 39, this core being formed with a substantial Y-shaped passage 40 for permitting communication between the pipe 38 and either one of the pipes 34 and 35. This valve is preferably positioned upon the steering column of the motor vehicle and within convenient reach of the operator, it being understood that the core 39 is provided with the usual operating handle.

The lamp socket 28 is in circuit with a source of electric supply which may be and preferably is, the usual storage battery and in view of the above description it will of course be understood that the normal position of the arrow-shaped casing 38 and the weighted member 26 the combination of the two functioning as an indicating arm is in a vertical position as per Figures 3 and 4, this position being occasioned by the weighted member 26, it being understood that the roller 19 contacting with the enlarged end of the heart-shaped cam 18 maintains this indicating arm against rocking movement. When it is desired to extend the arm to a position toward the right, in Figure 2, the valve core 39 is moved into the position of Figure 6 for thereby creating a suction through the pipe 35 within the lower end of the cylinder 7 which will thereby draw the piston 10 downwardly for occasioning such a movement of the indicating arm. As soon as the valve is moved to a closed position, per Figure 5, the suction will be broken for allowing the indicating arm through the instrumentality of the weighted member 26 to move again to its vertical unindicating position. For extending the indicating arm in such a direction as to indicate a left turn the valve is moved to the position of Figure 7 for causing a suction in the pipe 34 within the top of the cylinder for raising the piston 10 therein.

Referring particularly to Figures 8 and 9, there is shown a slightly modified form of indicating arm adapted to be employed, if desirable, in lieu of the indicating arm comprising the casing 32 and weighted member 26. This indicating arm embodies an elongated sleeve 29' of an insulating material formed upon one side with an annular projection 25' similar in all respects to the annular projection 25 formed upon the said weighted member 26 comprising a portion of the indicating arm of the preferred embodiment of the invention. Within this sleeve 29 is a double ended lamp socket 28' within which are electric lamps 30'. Adjacent the opposite ends of the said sleeve 29' there is formed beads 31' and upon one end of the sleeve is removably positioned a celluloid tube 34' that is formed adjacent one end with a channel 33' for engagement over said bead 31'. The opposite end of this tube is formed with a conical shaped head 39 whereby the said tube is in the general formation of an arrow.

Upon the opposite end of said sleeve 29' is a drum shaped hollow member 26' of celluloid or other translucent material, this member being formed with a neck portion 40 for engagement over the end of said sleeve 29', it being noted that this neck portion is formed adjacent its end with a channel for the reception of the said bead 31' of the sleeve 29'.

As above mentioned, the tubular member 34' is of celluloid as is also the drum shaped member 26', the tubular member being of a frosted or clear nature while the drum shaped member is preferably of the color green.

Although I have shown and described my signal as being actuated through the suction within the intake manifold of the engine it is nevertheless to be understood that equal results will be had if the pipe 38 of the valve is connected with a source of fluid pressure.

It is further to be understood that minor changes may be made therein, without departing from the spirit and scope of the invention as claimed.

Having thus described my invention, what I claim as new and desire to secure by Letters Patent is:

1. In a direction indicator of the class described, a fixed support, an indicating arm pivoted to the support, means for maintaining the arm in a normal vertical upwardly swung position, and suction controlled means for swinging said arm downwardly in opposite directions from its normal vertical position.

2. In a direction indicator of the class described, a support, an indicating arm pivoted to the support, means for bringing the arm at rest in a normal vertical upwardly swung position, suction controlled means for swinging said arm downwardly in opposite directions from its normal vertical position, and yieldable means for normally maintaining said arm against accidental swinging movement.

3. A vehicle signal of the class described, a casing, an arm pivoted to the casing, means for bringing the arm at rest in a normal vertical upwardly swung position, a shaft within the casing rigidly connected to said arm and having a spur gear fixed thereon, a cylinder within the casing, a piston within said cylinder, a rod secured at one end to said piston having a racked edge in engagement with said spur gear, and suction means for moving said piston to move the arm downwardly in opposite directions from its normal vertical position.

4. In a direction indicator, a support, an indicating arm, a horizontal shaft journaled on the support and having said arm fixed thereon, one end of said arm being weighted to maintain the arm in a normal upwardly swung vertical position, a heart shaped cam fixed upon the shaft, yieldable means co-operating with said cam for holding the indicating arm against accidental swinging movement from its normal vertical position, and manually controlled means for selectively swinging said arm downwardly in either direction, at will.

In testimony whereof I affix my signature.

HOWARD W. SPUNG.